United States Patent [19]

Douglas

[11] Patent Number: 4,568,183
[45] Date of Patent: Feb. 4, 1986

[54] DETECTION OF CHANGES IN TRANSPARENCY OF OPTICAL ELEMENTS

[75] Inventor: Joseph Douglas, Skipton, England

[73] Assignee: Rolls-Royce Limited, London, England

[21] Appl. No.: 508,566

[22] Filed: Jun. 28, 1983

[30] Foreign Application Priority Data

Jul. 15, 1982 [GB] United Kingdom ................ 8220560

[51] Int. Cl.$^4$ .......................... G01J 5/08; G01N 21/15
[52] U.S. Cl. ........................................ 356/43; 356/44; 356/239; 374/130
[58] Field of Search ........................ 356/43, 44, 45, 46, 356/47, 48, 49, 50, 237, 239, 435; 374/123, 130, 131, 129, 125; 136/213, 214, 215; 250/554, 372; 340/578, 577

[56] References Cited

U.S. PATENT DOCUMENTS

| | | | |
|---|---|---|---|
| 3,797,941 | 3/1974 | Staes et al. ...................... | 356/222 X |
| 4,222,663 | 9/1980 | Gebhart et al. ...................... | 356/45 |
| 4,306,835 | 12/1982 | Hurley .............................. | 356/43 X |
| 4,326,798 | 4/1982 | Kahn ................................. | 356/43 X |
| 4,365,896 | 12/1982 | Mihalow ........................... | 356/239 X |
| 4,408,827 | 10/1983 | Guthrie et al. ................... | 356/43 X |
| 4,435,093 | 3/1984 | Krause et al. ...................... | 374/129 |

*Primary Examiner*—Vincent P. McGraw
*Assistant Examiner*—Robert D. V. Thompson, III
*Attorney, Agent, or Firm*—Cushman, Darby & Cushman

[57] ABSTRACT

In a radiation pyrometer in a gas turbine engine, non-uniformly distributed changes in transparency of an optical element in the system, e.g. contamination of pyrometer objective lens $L_1$ by combustion products from the turbine can be automatically detected. Lens $L_1$ focusses radiation from target T onto an additional lens $L_2$, which in turn focusses it onto the end E of the fibre-optic bundle F. Considered reciprocally, lens $L_2$ images the end E of fibre-optic F into $L_1$, so that although each optical fibre in end E receives radiation from all parts of target T, each fibre is imaged into a corresponding discrete area of $L_1$. Fibre-optic bundle F comprises two (or more) sub-bundles $F_1$ and $F_2$ forming complementary sub-areas of end E and each sub-bundle is provided with its own photodetector $P_1$, $P_2$ and associated pre-amplifier $A_1,A_2$ adjusted so that their outputs $A_1S_1$ and $A_2,S_2$ are matched at the non-contamination condition. When one part of lens $L_1$ is contaminated during service more than the other parts, this will show as an unacceptable mis-match between the outputs $A_1S_1$ and $A_2S_2$. This is automatically detected by differential amplifier D whose output gives a warning indication and can also be used to trigger a selector circuit X to select the strongest signal for onward transmission.

11 Claims, 3 Drawing Figures

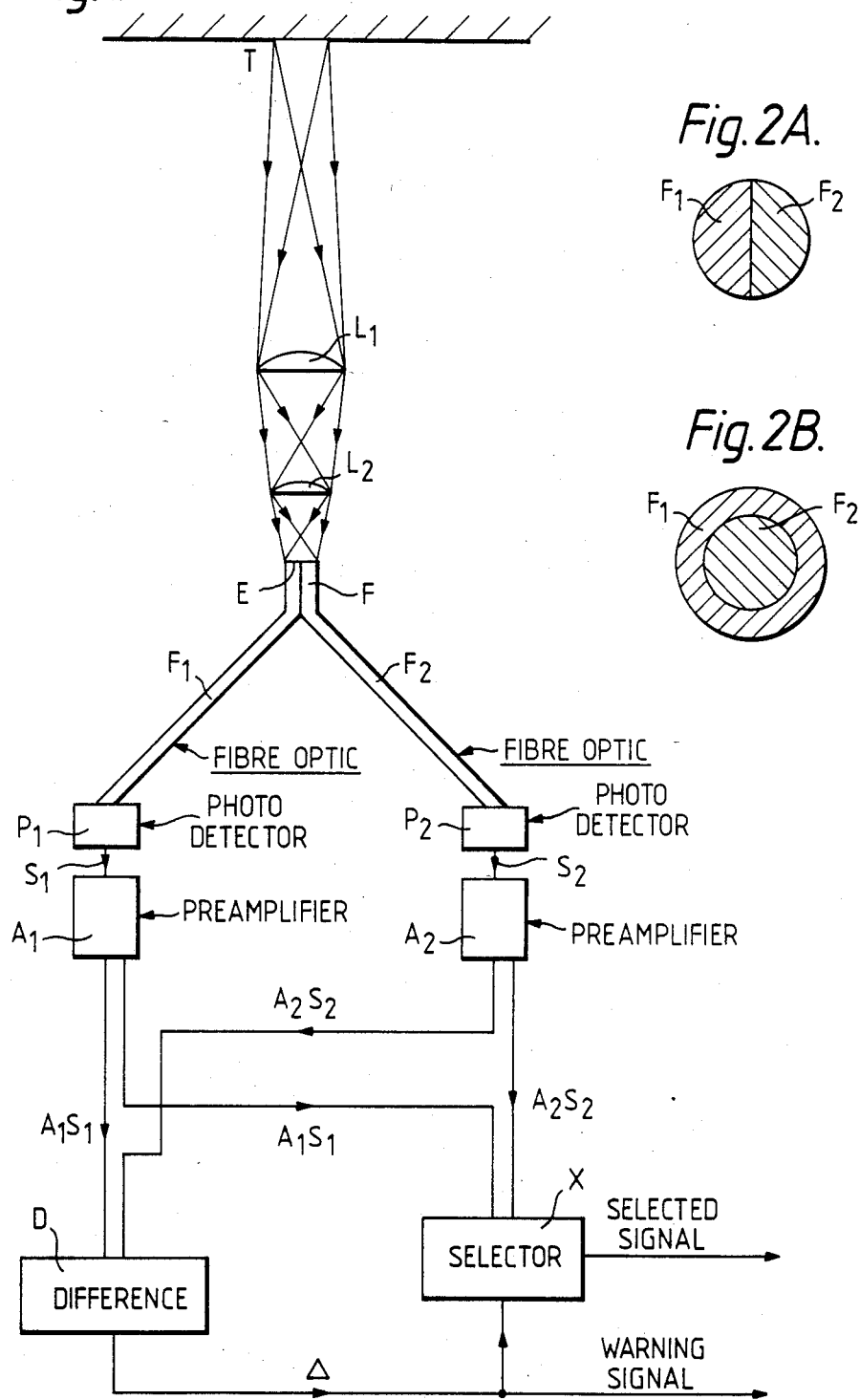

DETECTION OF CHANGES IN TRANSPARENCY OF OPTICAL ELEMENTS

The present invention relates to the detection of changes in transparency of optical elements, and particular to a technique for automatically detecting non-uniformly distributed change in the transparency of an optical element in an optical system. It is of particular benefit as an adjunct to a radiation pyrometer system for giving warning of reduced transparency of the object lens of the pyrometer due to soot or other contaminants, and may also be used in automatically compensating at least partially for the effects of the contamination.

Radiation pyrometers used in gas turbine engines to monitor turbine blade temperatures for purposes of engine control or engine life recording are subject to the gradual build-up on the objective lens (or other objective element such as a viewing window) of deposits of combustion products from the hot turbine gases. This can happen despite attempts to shield the objective element by known means such as causing a "curtain" of clean air to flow past the lens.

Currently used systems cannot automatically detect and correct for this build-up of contaminants, though such detection and correction is desirable because contamination results in reduced transparency of the objective element and hence a reduction in sensitivity of the pyrometer. As a consequence of reduced sensitivity, the engine may overheat in the case of a pyrometer used for engine control, or the life usage may be under-estimated in the life recording case. Both of these situations are potentially dangerous.

The present invention can detect contamination of an optical element optoelectronically by making use of the fact that the contamination is not usually evenly distributed over the exposed surface of the element.

According to the present invention, an optical system includes means for detecting non-uniformly distributed change in the transparency of an optical element in the system, said means including a light-receiving surface comprising a plurality of receptor areas, an optical arrangement whereby each receptor area receives, from a corresponding area of the optical element, light transmitted by the optical element, a plurality of photodetector elements in one-to-one correspondence with the plurality of receptor areas such that each photo-detector element gives an electrical signal whose strength depends on the intensity of light received by its corresponding receptor area, and signal processing means for processing the photodetector output signals so as to detect differences between the signal strengths provided such differences lie outside predetermined limits of acceptability, detection of such differences indicating a significant change in transparency in at least one area of the optical element corresponding to a receptor area.

For the purposes of the present specification and claims, the word "light" includes all electromagnetic radiation capable of being refracted by optical systems.

The signal processing means may include means for selecting the photodetector output signal of greatest strength for onward transmission to further processing means.

The light-receiving surface may comprise two receptor areas. In one variation, each receptor area may comprise a semi-circular area such that together they form a circular light-receiving surface. In another variation, one receptor area may comprise a circular area and the other receptor area may comprise an annular area surrounding the circular area.

Preferably, the light-receiving surface is the end surface of a fibre-optic bundle, discrete sub-bundles of whose fibres define the receptor area, but alternatively the light-receiving surface may comprise the collective photosensitive surfaces of the photodetector elements, the photosensetive surface of each photodetector element comprising one of the receptor areas.

In a preferred arrangement of the optical system, the optical element comprises a first lens and the optical arrangement comprises a second lens, a first lens acting to focus incoming light onto the second lens and the second lens acting to image the first lens onto the light-receiving surface.

It is preferred that the signal processing means comprises differencing circuit means which gives a difference output signal when unacceptable differences occur between the strengths of the photodetector output signals, and selection circuit means arranged to be triggered by receipt of a difference output signal to select the strongest photodetector signal for onward transmission to further processing means.

An exemplary embodiment of the invention will now be described with reference to the accompanying drawings, in which:

FIG. 1 is a schematic representation of a radiation pyrometer system incorporating the invention; and FIGS. 2A and 2B show diagrammatically two possible configurations for the receptor areas.

Referring to FIG. 1, there is shown the relevant portions of a radiation pyrometer system adapted to produce a system output signal which is a measure of the intensity of radiation at a chosen wavelength and wavelength band received by photodetectors $P_1$ and $P_2$ from a target area T. T may, for example, be a location on a particular turbine blade in an axial flow gas turbine engine in which the pyrometer is installed, the pyrometer being controlled by a timing circuit (not shown) synchronised to the rotation of the turbine rotor as known in the prior art so that radiation from the aforesaid location (or any other desired location at the same radius around the rotor) can be received by photodetectors $P_1$ and $P_2$ once per revolution of the rotor, and its temperature thereby measured in real time.

The optical system for the pyrometer of FIG. 1 comprises an objective lens $L_1$ for focussing radiation from targer T onto a further focussing lens $L_2$, which in turn images the first lens $L_1$ onto the end of a fibre-optic bundle F. As described in more detail later, the fibre-optic bundle comprises two sub-bundles $F_1$ and $F_2$ which guide the light received on the plane light-receiving end E of fibre-optic bundle F to the respective photo-detectors $P_1$ and $P_2$ whose output signals $S_1$ and $S_2$ have voltage values which are dependant upon the intensity of the light received by the photo-detectors $P_1$ and $P_2$. $P_1$ and $P_2$ are in fact photo-diodes fitted with filters so as to be sensitive only to the chosen wavelength or wavelength band.

In prior art pyrometers, the objective lens, which may be a compound element, is made to focus radiation from a target directly onto a photo-detector or onto a fibre-optic bundle leading thereto. Considered reciprocally, each point on the light-receiving surface of the photodetector assembly (or each fibre-end in the light-receiving surface of the fibre-optic bundle) is imaged by the whole of the objective lens onto a corresponding discrete part of the target. It will therefore be realised that if the objective lens becomes contaminated by dirt from the turbine gases such as carbon particles (soot), the consequential reduction in transparency of the lens, even if such reduction in transparency is localised rather than spread evenly over the exposed lens surface, will result in a reduction in the intensity of the light received at all points on the photo-detector surface, or at all fibres in the bundle, as the case may be.

The optical arrangement of FIG. 1 changes this in that instead of lens $L_1$ acting to image the light-receiving end surface E of fibre-optic bundle F onto the target T, it acts to image the extra lens $L_2$ onto the target T, the end E being imaged onto lens $L_1$ by lens $L_2$. Consequently, each fibre-end in surface E receives radiation from all parts of the target T, but is imaged onto a corresponding discrete area of lens $L_1$. This is analogous to a conventional film projection system where a condenser lens images the lamp filament into the projector lens to provide even illumination of the screen.

With the lens arrangement of FIG. 1, it becomes possible to examine discrete areas of the objective lens $L_1$ for contamination, since localised reduction in transparency of lens $L_1$ will only affect some of the fibre-ends in bundle F.

Usually, one part of the exposed surface of lens $L_1$ will be contaminated during service more than the other parts and to detect this, fibre-optic bundle F comprises the afore-mentioned two sub-bundles $F_1$ and $F_2$, one of which receives light transmitted by that area of the lens $L_1$ known to be more liable to contamination, and the other one of which receives light transmitted by the rest of the lens. Each fibre-optic sub-bundle $F_1$ and $F_2$ transmits the light it receives to its respective photodiode $P_1$ and $P_2$ and the output signals $S_1$ and $S_2$ from the photodiodes are passed to respective preamplifiers $A_1$ and $A_2$ which are adjusted so that before any contamination of the lens $L_1$ has occured the pyrometer output signals $A_1S_1$ and $A_2S_2$ are equal for any given intensity of light from target T.

Each preamplifier $A_1$ and $A_2$ has two outputs as shown in FIG. 1, the same pyrometer signal $A_1S_1$ or $A_2S_2$, as the case may be, appearing on each of the two outputs. A differencing circuit D receives an output from each preamplifier $A_1$ and $A_2$, as does a selector circuit X, which also receives a positive or negative difference signal $\Delta$ from D. Any differences in value between signals $A_1$ and $S_1$ and $A_2$ and $S_2$—beyond those due to manufacturing and component mis-match tolerances—are indicative of differential contamination of lens $L_1$: hence signal $\Delta$ is utilised as a warning signal indicative of the fact that significant contamination of lens $L_1$ has occured, and that cleaning is required; meanwhile in order to minimise the error caused by lens contamination until cleaning can be undertaken, signal $\Delta$ is used to trigger selector circuit X to select for onward transmission to further signal processing apparatus, such as computer storage, whichever of the two signals $A_1S_1$ and $A_2S_2$ has the highest value, since this signal will be the one least affected by the lens contamination and will give the most nearly correct measure of the true temperature of target T. If $\delta$ is the allowed variation in signal strength from preamplifiers $A_1$ and $A_2$ due to manufacturing and component mis-match, circuits D and X must be arranged so that if $$A_1S_1 \pm \delta > A_2S_2 \pm \delta$$

then the output $\Delta$ from differencing circuit D is (say)-positive, and causes selector circuit X to select signal $A_1S_1$ for onward transmission, whereas if $$A_1S_1 \pm \delta < A_2S_2 \pm \delta,$$

then $\Delta$ is negative and causes X to select signal $A_2S_2$.

The choice of how to divide the light-receiving end surface E of fibre-optic bundle F into two receptor areas which are the light-receiving ends of the two sub-bundles $F_1$ and $F_2$ and which monitor two discrete areas of lens $L_1$, can be based on experience gained in tests for lens contamination using the same arrangements which will be adopted in the real situation. For example, if it is found that one side of the lens $L_1$ is affected more than the other, then assuming that end surface E is circular in plan view as shown in FIG. 2A, it should be split into two sections along a diameter in the manner of a back-to-back double "D" so that each sub-bundle $F_1$ and $F_2$ monitors a corresponding half of the lens area. If, on the other hand, the contamination occurs at the centre or edge of lens $L_1$, then a concentric area geometry as in FIG. 2B would be preferred.

Although in the above description end surface E of fibre-optic F has only been divided into two receptor areas comprising the ends of sub-bundles $F_1$ and $F_2$, division into a greater number of receptor areas and corresponding sub-bundles is possible if this is found to be desirable in order to monitor the contamination adequately; but it has to be remembered that the use of more sub-bundles results in a corresponding increase in the number of photodiodes and preamplifiers, and in the complexity of the subsequent electronics for signal processing.

The above description has concentrated on the use of fibre-optics to facilitate working of the invention because fibre-optic light guides are commonly used in radiation pyrometers for gas turbine engines. However, it will be clear to those skilled in the art that the invention can be worked without fibre-optic devices by using optical beam splitting techniques or by allowing the lenses to project radiation from the target directly onto multi-element photo-detectors whose photo-sensitive areas are of appropriate shape.

The differencing circuit D and the selector circuit X are types of analogue circuit which are well known in themselves and have therefore not been described in detail. Their functions as signal processors can be performed in alternative ways, e.g.; (1) the selector circuit could be a "highest wins" circuit, which would not need an input from differencing circuit D, since such circuits select the strongest signal for onward transmission without external prompting; (2) both circuits D and X could be replaced by appropriate discrete digital circuits or an appropriately programmed computer or microprocessor, analogue-to-digital converters being included in the arrangement after preamplifiers $A_1$ and $A_2$.

Although the above embodiments of the invention have been set in the context of radiation pyrometry, the invention is of course also applicable to other optical instruments, including those in which the optical element liable to contamination is not a lens or plane window but a prism or mirror. Where the optical element is an optical surface acting as a mirror, references in this specification and the following claims to transparency of the optical element should be read as references to reflectivity of the optical element as appropriate; and further to this, the definition of light should be read as including electromagnetic radiation capable of being reflected in an optical system. Note that the optical arrangement whereby each receptor area receives, from a corresponding area of the optical element, light transmitted by the optical element, could itself include at least one reflective optical element.

I claim:

1. An optical system including means for detecting non-uniformly distributed change in the transparency of an optical element in said system, said means comprising:

a plurality of light receptor areas in one-to-one correspondence with a plurality of predefined surface areas of said optical element;

an optical means for imaging each of said predefined surface areas of said optical element onto a corresponding light receptor area, a plurality of photodetector elements in one-to-one correspondence with said plurality of light receptor areas, each of said photodetector elements giving an electrical output signal whose strength depends on the light intensity of light received by its corresponding light receptor area; and signal processing means for processing said photodetector element output signals to detect differences between the signal strengths provided such differences lie outside predetermined limits of acceptability, detection of such differences indicating a significant change in transparency of at least one of said predefined surface areas of said optical element.

2. An optical system according to claim 1 in which the signal processing means includes means for selecting the photodetector output signal of greatest strength for onward transmission to further processing means.

3. An optical system according to claim 1 in which said plurality of light receptor areas comprises two light receptor areas.

4. An optical system according to claim 3 in which each receptor area comprises a semi-circular area such that together they form a circular light-receiving surface.

5. An optical system according to claim 3 in which one receptor area comprises a circular area and the other receptor area comprises an annular area surrounding the circular area.

6. An optical system according to claim 1 in which the light receptor areas comprise the end surface of a fibre-optic bundle, discrete sub-bundles of whose fibres define the receptor areas.

7. An optical system according to claim 1, wherein the optical system comprises an optical radiation pyrometer including a pyrometric photodetector which includes the photodetector elements.

8. An optical system according to claim 7 in which the optical element is the objective element of the pyrometer.

9. An optical system according to claim 1 in which the signal processing means comprises differencing circuit means for giving a difference output when unacceptable differences occur between the strengths of the photodetector output signals, and selection circuit means triggered by receipt of a difference output from the differencing circuit means, for selecting the photodetector signal of greatest strength for onward transmission.

10. An optical system according to claim 1 in which each light receptor area comprises a photosensitive surface of one of said photodetector elements.

11. An optical system according to claim 1 in which said optical element comprises a first lens, and said optical means comprises a second lens, said first lens acting to focus incoming light onto said second lens and said second lens acting to image said first lens onto said light receptor areas.

* * * * *